Aug. 26, 1930.    R. S. SANFORD    1,773,755
BRAKE MECHANISM
Filed Oct. 30, 1926
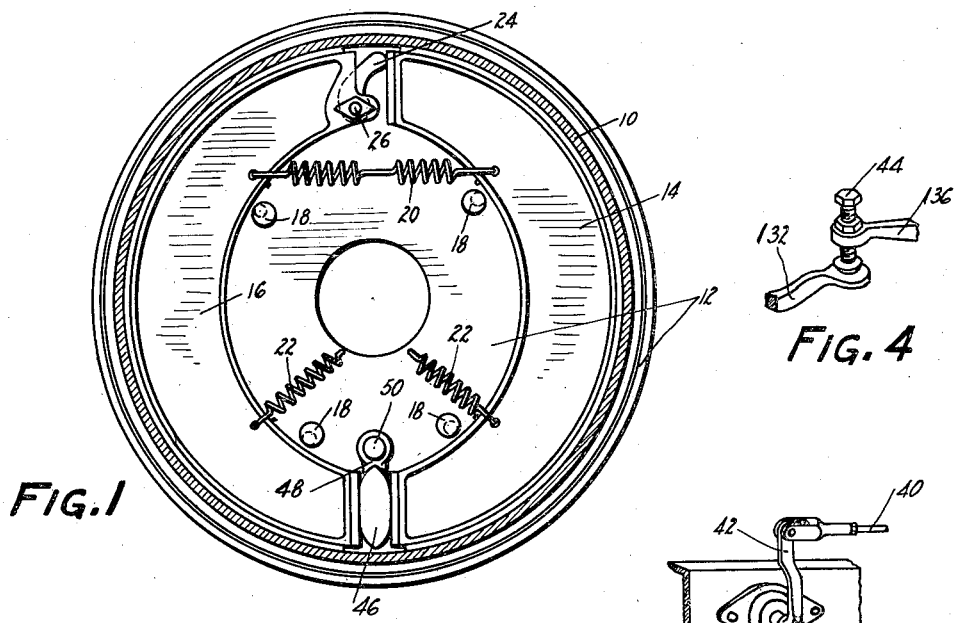
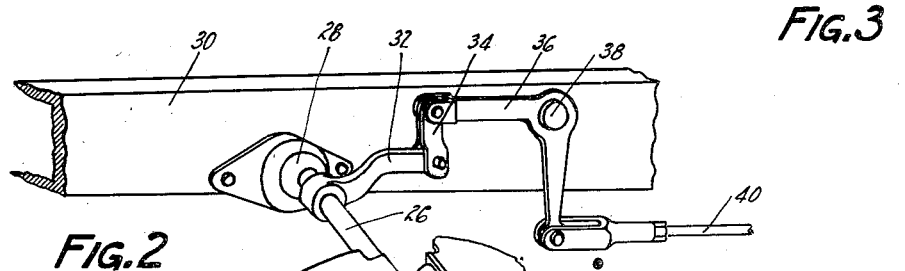
INVENTOR
ROY S. SANFORD
BY
*m. W. McConkey*
ATTORNEY Patented Aug. 26, 1930

1,773,755

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

BRAKE MECHANISM

Application filed October 30, 1926. Serial No. 145,134.

This invention relates to brakes and is illustrated as embodied in a brake for one of the road wheels for an automobile.

One feature of the invention relates to taking the torque of the brake shoes or their equivalents by a device such as a cam arranged between the ends of the shoes and which shifts with the shoes when the brake is applied in such a manner as to exert a brake-applying force on the shoes. For example, the device may take the form of a cam arranged between the ends of the shoes and having a lever extending radially inward and pivoted at its inner end so that the shifting of the cam when the brake is applied also turns the cam to exert a spreading action on the shoes.

Another feature of the invention relates to novel means for applying the brake shown as a shaft movably supported on the chassis frame on its inner end and at the end of one of the brake shoes at its outer end and having a cam or other operating device engaging the end of the other shoe. This greatly facilitates the floating of the operating means required by the novel anchorage of the brake.

The above and other objects and features of the invention, including various novel desirable combinations of parts and desirable particular constructions, will be apparent from the following description of one illustrative embodiment shown in the accompanying drawing, in which:

Figure 1 is a vertical section through the brake just inside the head of the brake drum and showing the brake shoes in side elevation;

Figure 2 is a partial perspective showing the brake-operating means and its method of support on the chassis and on the brake shoes;

Figures 3 and 4 are views corresponding to a part of Figure 2 and showing modifications of the operating means;

Figure 5 is a side elevation of a preferred means for operating the brake yieldingly;

Figure 6 is a view corresponding to the lower part of Figure 5 but showing the arrangement of the parts when the brake is applied; and Figure 7 is a detail view showing the connection at the brake cam.

The brake illustrated in Figure 1 includes a rotatable drum 10, at the open side of which there is arranged a backing plate 12 and within which are arranged a pair of floating brake shoes 14 and 16 normally held in released positions determined by eccentric adjustable stops 18 by a return spring 20 connecting the upper ends of the shoes and by a pair of auxiliary return springs 22 connected to the lower ends of the shoes and to the backing plate 12.

The brake is intended to be applied by a projection or cam 24 integral with or secured to the outer end of a shaft 26 supported at its outer end by a ball-and-socket joint on the end of the shoe 16 and universally supported in a manner permitting axial movement at its inner end by a support 28 on the chassis frame 30. The support 28 may be formed as fully described in Patent No. 1,604,394, granted Bendix Brake Company October 26, 1926, on an application of A. Y. Dodge. The shaft 26 is rocked to apply the brake by a lever 32 connected by a thrust link 34 to a bell crank lever 36 pivoted at 38 on the chassis frame 30 and operated by a tension link 40. If preferred, as shown in Figure 3, the tension link 40 may be directly connected to a lever 42 on the shaft 26. As shown in Figure 4 an adjustment may be provided by substituting for thrust link 34 a set screw 44 threaded through the end of the bell crank lever 136 and engaging a flattened part at the end of the lever 132.

An important feature of the invention relates to the novel means for taking the torque of the brake and at the same time intensifying the brake application. In one very satisfactory arrangement, this means is in the form of a cam 46 arranged between the lower ends of the brake shoes 14 and 16 and provided with a radially extending arm or lever 48 pivoted at 50 at its inner end on the backing plate 12. Thus, when the brake is applied, whichever direction the drum is turning, the shoes with the device 46 will shift in the same direction for a short distance which will further spread the shoes apart to apply the brake, while at the same time the torque is transmitted through the device 46 to the pivot 50.

I prefer to provide means for operating the above-described brake yieldingly, one arrangement being shown in Figures 5 and 6. In this illustrated arrangement there is the usual emergency hand lever 52 pivoted at 54 and provided with an operating pawl 56 engageable with a ratchet 58. To the lower end of the lever 52 is pivotally connected a part 60 in the end of which there is threaded a member 62 passing through one end of a U-shaped connecting device 64 and having a head 66 between which and the end of the connecting device 64 is confined a coil spring 68. The other end of the U-shaped connecting member 64 is threaded on or otherwise connected to the end of the link 40 or to a link which in turn operates connections operating the link 40. It will be seen that rocking the lever 52 in a brake-applying direction causes the head 66 of the member 62 to compress the spring 68 and acts through the compressed spring and the connecting device 64 to apply force to the brake.

While one illustrative embodiment has been described in detail, it is not my intention to limit the scope of the invention to that particular embodiment, or otherwise than by the terms of the appended claims.

I claim:

1. A brake comprising, in combination, a drum, a plurality of shoes within and engageable with the drum, an anchoring device engaging adjacent ends of the shoes and arranged to shift slightly with the shoes when the brake is operated and so arranged as to force the shoes apart when so shifted, and applying means also acting to force the shoes apart.

2. A brake comprising, in combination, a drum, a plurality of shoes engageable with the drum, a cam engaging adjacent ends of the shoes and shiftable with the shoes when the brake is applied and arranged to turn when so shifted to force the shoes toward the drum, means for limiting shifting of the cam and taking the braking torque of the shoes through the cam, and an applying cam acting on the shoes at the side of the drum opposite the first cam.

3. A brake comprising, in combination, a drum, a plurality of shoes engageable with the drum, a device engaging adjacent ends of the shoes and shiftable with the shoes when the brake is applied and arranged to turn when so shifted to force the shoes toward the drum, and an applying device arranged between the other ends of the shoes.

4. Brake mechanism comprising, in combination, a drum, retarding means engageable with the drum, and a relatively long operating shaft supported at one end on the retarding means and having at said end a brake-applying device and universally supported at its opposite end.

5. Brake mechanism comprising, in combination, a drum, expansible retarding means engageable with the drum and having adjacent ends, and a relatively long operating shaft supported at one end on one of said ends and having at said end a thrust device acting on the other of said ends and universally supported at its opposite end.

6. Brake mechanism comprising, in comnation, a drum, expansible retarding means engageable with the drum and having adjacent ends, and a relatively long operating shaft supported at one end on one of said ends and having at said end a cam part engaging said other end and universally supported at its opposite end.

7. Brake mechanism comprising, in combination, a drum, retarding means engageable with the drum, and an operating shaft universally mounted at one end on the retarding means and having at said end a brake-applying device.

8. Brake mechanism comprising, in combination, a drum, expansible retarding means engageable with the drum and having adjacent ends, and an operating shaft universally mounted at one end on one of said ends and having at said end a thrust device acting on the other of said ends.

9. A vehicle having a brake and a chassis part opposite the brake, the brake including retarding means having adjacent separable ends, and comprising, in combination therewith, a brake-applying shaft universally supported at one end on the chassis part in a manner permitting it to move slightly axially, and universally supported at its other end on one of said parts and having a thrust device engaging the other of said ends.

10. A vehicle having a brake and a chassis part opposite the brake, the brake including retarding means having adjacent separable ends, and comprising, in combination therewith, a brake-applying shaft universally supported at one end on the chassis part in a manner permitting it to move slightly axially, and universally supported at its other end on one of said parts and having a cam engaging the other of said ends.

11. A vehicle having a brake provided with retarding means and a chassis frame member opposite the brake, and comprising, in combination therewith, a brake-applying shaft universally supported at one end on said retarding means and universally supported at its other end on said chassis frame member.

12. A vehicle having a brake provided with retarding means and a chassis frame member opposite the brake, and comprising, in combination therewith, a brake-applying shaft supported at one end on said retarding means and universally supported at its other end on said chassis frame member.

In testimony whereof, I have hereunto signed my name.

ROY S. SANFORD.